US010513615B2

(12) United States Patent
Doll et al.

(10) Patent No.: US 10,513,615 B2
(45) Date of Patent: Dec. 24, 2019

(54) NON-DUSTING EFFECT PIGMENT PREPARATION

(71) Applicant: Sun Chemical Corporation, Parsippany, NJ (US)

(72) Inventors: Jonathan Doll, Cincinnati, OH (US); Steven Johnson, Fairfield, OH (US); Christopher Miller, Cincinnati, OH (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 0 days.

(21) Appl. No.: 16/273,672

(22) Filed: Feb. 12, 2019

(65) Prior Publication Data
US 2019/0177552 A1 Jun. 13, 2019

Related U.S. Application Data

(63) Continuation of application No. PCT/US2017/047961, filed on Aug. 22, 2017.

(60) Provisional application No. 62/377,850, filed on Aug. 22, 2016.

(51) Int. Cl.
*C09D 5/03* (2006.01)
*C09C 3/04* (2006.01)
*C09C 3/08* (2006.01)
*C09C 3/10* (2006.01)
*C08K 9/04* (2006.01)
*C09C 3/06* (2006.01)
*C09C 1/00* (2006.01)
*C08J 3/20* (2006.01)
*C09C 1/64* (2006.01)

(52) U.S. Cl.
CPC ............. *C09C 3/045* (2013.01); *C08J 3/203* (2013.01); *C09C 1/0015* (2013.01); *C09C 1/0039* (2013.01); *C09C 1/64* (2013.01); *C09C 1/646* (2013.01); *C09C 3/063* (2013.01); *C09C 3/08* (2013.01); *C09C 3/10* (2013.01); *C09D 5/031* (2013.01); *C09D 5/032* (2013.01); *C09D 5/035* (2013.01); *C08J 2333/08* (2013.01); *C08J 2363/00* (2013.01); *C08J 2367/00* (2013.01); *C08J 2375/04* (2013.01)

(58) Field of Classification Search
None
See application file for complete search history.

(56) References Cited

U.S. PATENT DOCUMENTS

| 3,778,288 | A | * | 12/1973 | Ridge et al. | C08J 3/203 |
| | | | | | 106/502 |
| 4,116,924 | A | * | 9/1978 | Peabody | C08J 3/22 |
| | | | | | 106/400 |
| 4,725,317 | A | | 2/1988 | Wheeler | |
| 6,547,869 | B2 | | 4/2003 | Witt | |
| 7,172,812 | B2 | | 2/2007 | Greiwe et al. | |
| 7,485,674 | B2 | | 2/2009 | Takano | |
| 7,846,997 | B2 | | 12/2010 | Kruithof et al. | |
| 7,951,427 | B2 | | 5/2011 | Moens et al. | |
| 8,304,077 | B2 | | 11/2012 | Bubat et al. | |
| 8,883,905 | B2 | | 11/2014 | Takano et al. | |
| 2007/0107633 | A1 | | 5/2007 | Piontek et al. | |
| 2008/0022899 | A1 | | 1/2008 | Tsuji et al. | |
| 2008/0190769 | A1 | * | 8/2008 | Schuster | C09D 7/62 |
| | | | | | 204/471 |
| 2009/0252869 | A1 | | 10/2009 | Rodrigo et al. | |
| 2010/0095868 | A1 | * | 4/2010 | Kaupp | C09C 1/0015 |
| | | | | | 106/417 |
| 2010/0269733 | A1 | | 10/2010 | Kremitzl | |
| 2011/0207833 | A1 | * | 8/2011 | Albrecht | C09C 1/0012 |
| | | | | | 514/772.6 |

FOREIGN PATENT DOCUMENTS

| EP | 0 600 546 A1 | 6/1994 |
| WO | WO 2009/077191 A1 | 6/2009 |
| WO | WO 2010/031476 A2 | 3/2010 |

OTHER PUBLICATIONS

Benda-Lutz® 2081 FS Aluminium, Product Information Sheet, SunChemical, Apr. 15, 2013, 1 pg.
Benda-Lutz® Non-Leafing Aluminium Pigments, 7080 Powder, Product Information Sheet, SunChemical, Nov. 14, 2014, 2 pgs.
International Search Report and Written Opinion dated Dec. 4, 2107 for Application No. PCT/US2017/047961, 12 pgs.
International Preliminary Report on Patentability dated Feb. 26, 2019 for Application No. PCT/US2017/047961, 8 pgs.

* cited by examiner

*Primary Examiner* — Michael J Feely
(74) *Attorney, Agent, or Firm* — Frost Brown Todd LLC

(57) ABSTRACT

A pigment pellet preparation, comprises one or more effect pigment and one or more thermosetting resin. The effect pigment is dispersed in the thermosetting resin. The thermosetting resin has 3 or more reactive terminal groups and has an acid number from about 10 to about 50 mg KOH/g resin. The preparation comprises from about 70% to about 90% by weight of one or more effect pigment and from about 5% to about 35% by weight of one or more thermosetting resin. The pigment and thermosetting resin comprise about 95% or more of the preparation. The pellets have a diameter of about 0.5 mm to about 5 mm and a length of about 1 mm to about 5 cm.

19 Claims, No Drawings

NON-DUSTING EFFECT PIGMENT PREPARATION

CROSS REFERENCE TO RELATED APPLICATIONS

The present application hereby claims the benefit of PCT/US2017/047961, filed on Aug. 22, 2017, which claimed the benefit of the provisional patent application titled, "Non-Dusting Effect Pigment Preparations," Ser. No. 62/377,850, filed on Aug. 22, 2016, the disclosure of which is herein incorporated by reference in its entirety.

BACKGROUND

Powder coatings are a solvent-free coating system used in a number of applications, including automotive coatings and office furniture. Powder coatings are a type of coating made of a thermosetting resin system. They are applied to a substrate electrostatically and cured at relatively high temperatures. The advantages of powder coatings are that there are no solvents used when they are sprayed, which minimizes the environmental issues related to volatile organic compounds (VOCs). Additionally, any material that does not adhere to the substrate after spraying, known as "overspray," can be collected and used again resulting in very little waste.

Powder coatings are typically made by first combining resins, a crosslinker, fillers, organic or inorganic pigments, and any other ingredients together in an extruder. The resin is melted and the ingredients are mixed into the resin. The extruded resin is then collected and milled to the required size distribution, usually by impact milling, to make a powder coating. Effect pigments are typically incorporated in subsequent processing steps.

For effect pigments such as aluminum flakes and pearlescent pigments, a significant portion of the color and appearance comes from their structure and shape, which is micron sized platelets with large aspect ratios (pigment width/pigment height). Because of their shape, they are very susceptible to bending and breakage under high shear mixing and have poor dispersion and orientation of the effect pigment in the powder coating. Thus, if they are incorporated during extrusion and/or milling steps, then the effect pigments are damaged and their appearance suffers.

An additional difficulty related to safety. To make any powder coating using effect pigments, a solvent free effect pigment powder must be used, which can cause a large release of dust as it is being dispensed. For pearlescent pigments, this can pose an inhalation hazard to those working with pearlescent pigments and precautions must be made to limit dust exposure. For metallic pigments, the dust not only poses an inhalation hazard, but can also be potentially explosive if clouds of dust are generated. This risk increases with the fineness of the pigments, and means that many converters will outsource the bonding of fine metallic pigments to reduce their risk.

BRIEF SUMMARY

A pigment pellet preparation, comprises one or more effect pigment and one or more thermosetting resin. The effect pigment is dispersed in the thermosetting resin. The thermosetting resin has 3 or more reactive terminal groups and has an acid number from about 10 to about 50 mg KOH/g resin. The preparation comprises from about 70% to about 90% by weight of one or more effect pigment and from about 5% to about 35% by weight of one or more thermosetting resin. The pigment and thermosetting resin comprise about 95% or more of the preparation. The pellets have a diameter of about mm to about 5 mm and a length of about 1 mm to about 5 cm.

These and other objects and advantages shall be made apparent from the accompanying drawings and e description thereof.

DETAILED DESCRIPTION

The pigment pellet preparation mitigates the issues in making and using effect pigments in powder coatings by providing an effect pigment preparation in a non-dusting, pelletized form. Moreover, the effect pigment preparation can be incorporated into a powder coating via bonding, dry blending, or milling the extruded powder coating. There is little loss in the appearance when the effect pigment preparation is used, and coated articles maintain a bonded appearance. This would allow converters to bond effect pigment safely, or even eliminate the bonding step altogether.

The pigment pellet preparation is non-dusting, thereby eliminating any hygienic, inhalation, or explosion hazards that can occur for when using effect pigment dust. In some embodiments, the pigment pellet preparation is friable.

The pigment pellet preparation can eliminate steps in the manufacturing process for powder coating compositions, saving time and increasing throughput. There is no degradation to the appearance of the effect pigments, and the product does not separate on application, allowing the overspray, which is often lost as scarp, to be reused. For these reasons, the existing customer base can be expanded with value added product.

The powder coating composition made using the pigment pellet preparation shows improvement to the process of making powder coating composition by requiring fewer steps and supplying the metallic pigment in a safer, less explosive form. Typically, the cure time for a powder coating composition made with the pigment pellet preparation will be about 8 minutes or less at 200° C.

The pigment pellet preparation comprises one or more effect pigments and a thermosetting resin. The effect pigment is dispersed in the thermosetting resin. The thermosetting resin has 3 or more reactive terminal groups and has an acid number from about 10 to about 50 mg KOH/g resin. The preparation comprises from about 70% to about 90% by weight of one or more effect pigment. The preparation comprises from about 10% to about 30% by weight thermosetting resin. The pigment and thermosetting resin comprise about 95% or more of the preparation. The pellets have a diameter of about 0.5 mm to about 5 mm and a length of about 1 mm to about 5 cm.

The pellet preparation is non-dusting and can be readily incorporated by blending and/or grinding into all types of solvent-free coating systems, including powder coating systems and dry toners. The pellet preparation has improved safety characteristics, gives a bonded appearance when incorporated into a powder coating, allows for high formulation flexibility, and gives converters options as to in which manufacturing step to add the pellet preparation to a solvent-free coating formulation.

The pellet preparation comprises a thermosetting resin. The thermosetting resin has 3 or more reactive terminal groups. The reactive terminal groups comprise epoxides, carboxylic acid, alcohol, hydroxyl, amine, isocyanate, acid anhydrides, blocked isocyanate, glycidyl, glycidyl methacrylate, and mixtures thereof. These reactive groups permit the thermosetting resin to crosslink when the resin is cured.

In some embodiments, the thermosetting resin has a $T_g$ of from about 55° C. to about 100° C., such as about 60° C. to about 100° C., about 60° C. to about 90° C., about 60° C. to about 80° C., about 65° C. to about 90° C., and about 65° C.

to about 80° C. The $T_g$ is the glass transition temperature, which is measured by differential scanning calorimetry.

The pigment pellet preparation comprises one or more thermosetting resin from about 5% to about 35% by weight, such as about 10% to about 35%, about 5% to about 30%, about 10% to about 30%, and about 10% to about 20%. In some embodiments, more than one thermosetting resin is used in the preparation.

The thermosetting resin has an acid number from about 10 to about 50 mg KOH/g resin. This acid number or acid value is the milligrams of KOH required to neutralize on gram of the resin. This is a common measurement and may be measured by ASTM D 974. In some embodiments, the acid number is from about 20 to about 50, about 30 to about 50, about 35 to about 50, about 10 to about 40, about 10 to about 35, about 10 to about 30, about 20 to about 40, about 25 to about 40, about 20 to about 35 or about 15 to about 35.

In some embodiments, the thermosetting resin comprises oligomers, which are two or more monomers, up to about 100 monomers, but shorter than polymers. In some embodiments, the oligomers have a molecular weight of about 10,000 to about 200,000.

Examples of thermosetting resins include, but are not limited to: polyesters, epoxies, acrylics, polyurethane, polyester/epoxy hybrids, and combinations thereof. In some embodiments, the polyester/epoxy hybrid resin has a weight ratio of polyester to epoxy of about 9:1 to about 1:9. The morphology of the resin can comprise linear, branched, hyperbranched, star, crosslinked, ladder, comb and combinations thereof.

The pigment pellet preparation comprises one or more effect pigment. The effect pigment may be any type of effect pigment known to those skilled in the art including, for example metallic pigments and pearlescent pigments.

The pigment pellet preparation comprises one or more effect pigment from about 70% to about 90% by weight, such as about 75% to about 90%, about 80% to about 90%, about 70% to about 85%, and about 75% to about 85%. In some embodiments, more than one effect pigment is used in the preparation.

In some embodiments, the effect pigment is a metallic pigment. The metallic pigment has a diameter of about 1 µm to about 500 µm and a thickness of about 1 nm to about 5 µm. The metallic pigment may also be of any type of class of metallic pigment. Examples of the shape of the metallic pigment include, but are not limited to platelet, flake shaped, cornflake, silver dollar, vacuum metalized flake (VMP), and combinations thereof. Additionally, the pigment may be described as leafing or non-leafing.

The metallic pigment may be made of any type of metal or alloy known to those skilled in the art. Examples of suitable metals or alloys include, but are not limited to aluminum, copper, copper-zinc alloys, copper-tin alloys, stainless steel, carbon steel, iron, silver, zinc, nickel, titanium, chromium, manganese, vanadium, magnesium, zinc-magnesium alloys, and mixtures thereof. In some embodiments, the metallic pigment comprises lubricant that is residual from its manufacture. Examples of lubricants include, but are not limited to saturated or unsaturated $C_2$—C fatty acids, fatty amines, fatty alcohols, fatty thiols, and combinations thereof, as well as other small molecule and polymeric surfactants and dispersants. The dispersant may be a surfactant or a polymeric dispersant. Examples of the dispersant include, but are not limited to Disperbyk 102, Disperbyk 103, Disperbyk 106, Disperbyk 107, Disperbyk 108, Disperbyk 109, Disperbyk 110, Disperbyk 111, Disperbyk 115, Disperbyk 118, Disperbyk 140, Disperbyk 142, Disperbyk 145, Disperbyk 161, Disperbyk 162, Disperbyk 163, Disperbyk 164, Disperbyk 167, Disperbyk 168, Disperbyk 170, Disperbyk 171, Disperbyk 174, Disperbyk 180, Disperbyk 181, Disperbyk 182, Disperbyk 184, Disperbyk 185, Disperbyk 187, Disperbyk 190, Disperbyk 191, Disperbyk 192, Disperbyk 193, Disperbyk 194N, Disperbyk 199, Disperbyk 2000, Disperbyk 2001, Disperbyk 2008, Disperbyk 2009, Disperbyk 2010, Disperbyk 2012, Disperbyk 2013, Disperbyk 2015, Disperbyk 2022, Disperbyk 2025, Disperbyk 2050, Disperbyk 2055, Disperbyk 2060, Disperbyk 2061, Disperbyk 2096, Disperbyk 2117, Disperbyk 2118, Disperbyk 2150, Disperbyk 2151, Disperbyk 2152, Disperbyk 2155, Disperbyk 2163, Disperbyk 2164, Disperbyk 2200, Tego Dispers 630, Tego Dispers 650, Tego Dispers 652, Tego Dispers 653, Tego Dispers 656, Tego Dispers 660 C, Tego Dispers 670, Tego Dispers 671, Tego Dispers 672, Tego Dispers 685, Tego Dispers 688, Tego Dispers 700, Tego Dispers 710, Tego Dispers735 W, Tego Dispers 740 W, Tego Dispers 745 W, Tego Dispers 750 W, Tego Dispers 752 W, Tego Dispers 755 W, Tego Dispers 757 W, Tego Dispers 760 W, Tego Dispers 761 W, Tego Wet 240, Tego Wet 250, Tego Wet 251, Tego Wet 260, Tego Wet 265, Tego Wet 270, Tego Wet 280, Tego Wet 500, Tego Wet 505, Tego Wet 510, Tego Wet KL245, EFKA 6220, EFKA 6225, and mixtures thereof.

In some embodiments, the effect pigment is a pearlescent pigment. The pearlescent pigment can be any pearlescent pigment known to those skilled in the art. Pearlescent pigments comprise a transparent, non-metallic, platelet-shaped substrate that is coated with one or more layers, such as metal oxides, having different refractive indices. The pearlescent pigment can be either single or multilayered. In some embodiments, there are multiple layers of metal oxides. In some embodiments, the multiple layers of metal oxides are layered so that there is a difference of at least 0.1 in the refractive indices of the consecutive layers. The pearlescent pigment may have an interference color when viewed over a black background. The interference color of the pearlescent pigment may be silver, yellow, gold, cyan, magenta, red, blue, green, violet, and shades thereof.

The non-metallic platelet substrate can be made of any material that can be used to make a pearlescent pigment, including, but not limited to natural mica, synthetic mica, bismuth oxychloride, graphite, aluminum oxide, micaceous iron oxide, perlite, silicon dioxide, titanium dioxide-coated mica and iron oxide-coated mica, and combinations thereof. In some embodiments, the diameter of the platelet-shaped substrate is from about 1 µm to about 500 µm and the thickness is about 5 nm to about 1 µm.

In some embodiments, the non-metallic platelet substrate of the pearlescent pigment is coated with one or more layers of a variety of metal oxides. Examples of metal oxides include, but are not limited to silicon dioxide, titanium dioxide, zinc oxide, zirconium dioxide, tin oxide, cerium dioxide, vanadium (IV) oxide, manganese oxide, lead oxide, chromium oxide, iron oxide, aluminum oxide, tungsten oxide, and mixtures and alloys thereof. In some embodiments, one or more layer comprises a hydrated oxide of any one or more of the aforementioned oxides. In some embodiments, one or more layer is a doped oxide of any one of the aforementioned oxides. In some embodiments, one or more layers comprises a hydrated oxide and one or more layers is a doped oxide of any one of the aforementioned oxides. The thickness of the metal oxide layers is variable but must allow for partial transparency. In some embodiments, the thickness of the metal oxide layers is from about 20 nm to about 350 nm.

In some embodiments, the effect pigment may be coated with a bonding agent, instead of or in addition to one or more metal oxide layers, that carries at least two reactive groups. The first group on the bonding agent attaches the bonding agent to the effect pigment, and the second group of the bonding agent can interact with the surrounding coating, or react with an organic layer or a combination of both. The first group of the bonding agent may be reacted with the oxide surface of the effect pigment. Examples of the first group include, but are not limited to methoxy silanes, ethoxy silanes, chlorosilanes, phosphoric acid esters, phosphonic acids, phosphonic acid esters, carboxylic acids, and combinations thereof. The first group is attached to the second group by way of an unreactive spacer of at least one repeating unit. Examples of the spacer include, but are not limited to alkyl chains, siloxanes, polyethers, polyesters, polyurethanes, or combinations thereof. The second group of the bonding agent may interact with the surrounding coating and/or able to react with an additional organic coating layer, such as a polymer or polymer network. In some embodiments, the second group of the bonding agent may not be chemically bonded to the coating. Examples of the second group include, but are not limited to alkyl groups, acrylates, vinyl compounds, carboxy-containing compounds, amines, alkoxy groups, cyano groups, isocyanates, epoxy groups, hydroxyl groups, and combinations thereof.

In some embodiments, the effect pigment is coated with one or more layers. In general, if a layer is present on the surface of the effect pigment it is adhered via a bonding agent. Examples of layers that coat the effect pigment include, but are not limited to silica, silicones, polyesters, polyamides, polysiloxanes, polyacrylates, polystyrenes, polyurethanes, polyalkyl acrylates, polyolefins, polyethers, polyalkoxides, and mixtures thereof. In some embodiments, the layers made from polymers may have a linear, branched, or crosslinked morphology and may be adhered to the surface of the effect pigment.

In some embodiments, the pigment pellet preparation contains at least one additional additive. The additional additives are present at no more than 5% by weight, with respect to the total weight of the pigment pellet preparation. Examples of additives include, but are not limited to crosslinking agents, flow control additives, antioxidants, degassing additives, light stabilizers, UV absorbers, dispersants, lubricants, charge control additives, anti-caking additives, mar resistance additives, texturizing additives, gloss control additives, catalysts, tougheners, antibacterial additives, adhesion promoters, sealants, anti-condensation additives, IR reflectors, organic pigments, inorganic pigments, fillers, and/or blends and combinations thereof.

In some embodiments, the pigment pellet preparation contains no residual solvent.

In some embodiments, the effect pigment preparation is made by mixing the thermosetting resin with an effect pigment. Generally, the thermosetting resin is mixed with a solvent at temperature of around 100° C. The effect pigment is pasted in an organic solvent and the thermosetting resin mixture is added to the effect pigment paste. The resulting mixture is mixed until uniform. The resultant paste is then pressed through a screen to form pellets and then dried.

In some embodiments, the effect pigment is added to the resin mixture as a dry powder to form a paste. The paste is added to an extruder and pressed through a die plate to make pellets. In some embodiments, the paste is pressed through a die plate without the use of an extruder.

Examples of solvents include, but are not limited to, mineral spirits, hexane, heptane, octane, nonane, decane, dodecane, petroleum distillates, benzene, toluene, xylene, gasoline, kerosene, Aromatic 100, Aromatic 150, Aromatic 200, ethanol, propanol, isopropanol, 1-propanol, n-propanol, n-butanol, 1-butanol, 2-butanol, water, all types of glycol ethers, ketones, alcohols, and mixtures thereof.

In some embodiments, optional additives are added to the pigment/resin mixture prior to pellet formation.

To make the powder coating composition, the pigment pellet preparation can be extruded, ground into, dry blended or bonded with the powder coating resin of the current invention according to methods known to those skilled in the art.

In some embodiments, the pigment pellet preparation is incorporated into the powder coating during the extrusion step. The powder coating ingredients are added to an extruder set at a temperature below the cure temperature for the powder coating. After the powder coating ingredients are uniformly mixed, the pigment pellet preparation is added to the extruder so that the total pigment content is between 0.1-10% by weight. The extruded resin is cooled and ground into a powder coating using a blender, hammer mill, or other dry grinding method.

In some embodiments, the pigment pellet preparation is incorporated into the powder coating during the milling step and not the extrusion step, thereby eliminating the issues with shear damage during extrusion. The pigment pellet preparation is typically added to the large, cooled fragments of finished powder coating as it leaves the extruder, but prior to being ground to a size that is appropriate for powder coating use. The pigment pellet preparation may be ground into the extruded powder coating by any method known to those skilled in the art for reducing the size of an extruded powder coating, including impact milling, hammer milling, pin-disc milling, air-classifying milling, jet milling and other known methods.

In some embodiments, the pigment pellet preparation is incorporated into the powder coating by bonding. The pigment pellet preparation is typically added to the milled and classified finished powder coating in a blender or mixer in the absence of solvent and stirred slightly above the softening point of the finished powder coating. Any instrument or machine currently known in the art may be used to bond the pigment pellet preparation to the powder coating powder particles.

In some embodiments, the pigment pellet preparation is incorporated into the powder coating by dry blending. The pigment pellet preparation is typically added to the milled and classified finished powder coating in a blender or mixer in the absence of solvent and additional heaing. Any instrument or machine currently known in the art may be used to incorporate the effect pigment preparation.

In some embodiments, the powder coating composition comprises a powder base selected from polyester-polyurethane hybrids, TGIC-polyesters, diglycidyl terephthalate-polyesters, β-hydroxyalkamide polyesters, acrylics, acrylic-urethane hybrids, GMA acrylics, acrylic-epoxy hybrids, epoxies, epoxy-polyester hybrids, epoxy-urethane hybrids, poly(vinyl chloride)s, polyolefins, thermoplastic polyesters, polyamides, poly(vinylidene fluoride)s, and combinations thereof.

In some embodiments, the powder coating composition comprises one or more additive. Examples of additives include, but are not limited to crosslinking agents, flow control additives, antioxidants, degassing additives, light stabilizers, UV absorbers, dispersants, lubricants, charge control additives, anti-caking additives, mar resistance additives, texturizing additives, gloss control additives, catalysts, tougheners, antibacterial additives, adhesion promoters, sealants, anti-condensation additives, IR reflectors, organic pigments, inorganic pigments, fillers, and/or blends and combinations thereof.

In some embodiments, the powder coating composition comprises one or more additional colored pigment, effect pigment, extender or dye. Illustrative examples of the color pigment include azo pigments, polycylic pigments, anthraquinone pigments including monoazo pigments, disazo pigments, disazo condensation pigments, naphthol pigments, benzimidazolone pigments, isoindolinone pigments, isoindoline pigments, metal complex pigments, quinacridone pigments, perylene pigments, carbon black pigments, phthalocyanine pigments, perinone pigments, diketopyrrolo-pyrrole pigments, thioindigo pigments, anthropyrimidine pigments, flavanthrone pigments, anthanthrone pigments, dioxazine pigments, triarylcarbonium pigments, quinophthalone pigments, titanium oxides, iron oxides, vanadium oxides, chromium oxides, zinc oxides, copper oxides, manganese oxides, azurite, zinc chromates, tungsten oxides, cadmium sulfides, zinc sulfides, cadmium mercury sulfides, iron sulfides, aluminosilicates, aluminum oxides, cerium oxides, spinel pigments, lanthanum hexaborides, and combinations thereof.

Illustrative examples of the effect pigment include flake-form pigments of titanium dioxide coated mica, iron oxide coated mica, titanium iron oxide coated mica, aluminum, brass, copper, silica, aluminum oxide, and combinations thereof.

Illustrative examples of the extender include aluminum silicate clays, talc, diatomaceous earth, silica, polymer microbeads, zinc oxide, barium sulfate, calcium carbonate, mica, and combinations thereof.

Illustrative examples of the dye include azo or azo condensed, a metal complex, benzimidazolones, azomethines, methines such as cyanines, azacarbocyanines, enamines, hemicyanines, streptocyanines, styryls, zeromethines, mono-, di-, tri-, and tetraazamethine; caratenoids, arylmethane such as diarylmethanes and triarylmethanes; xanthenes, thioxanthenes, flavanoids, stilbenes, coumarins, acridenes, fluorenes, fluorones, benzodifuranones, formazans, pyrazoles, thiazoles, azines, diazines, oxazines, dioxazines, triphenodioxazines, phenazines, thiazines, oxazones, indamines, nitroso, nitro, quinones such as hydroquinones and anthraquinones; rhodamines, phthalocyanines, neutrocyanines, diazahemicyanines, porphyrazines, porphirines, perinones, rylenes, perylenes, pyronins, diketopyrrolopyrroles, indigo, indigoids, thioindigo, indophenols, naphthalimides, indolenes, isoindolines, isoindolinones, iminoisoindolines, iminoisoindolinones, quinacridones, flavanthrones, indanthrones, anthrapyrimidines, quinophthalones, isoviolanthrones, pyranthrones, and combinations thereof.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

Example 1

Comparative

Commercial product Benda-Lutz® 2081 (Sun Chemical, Parsippany, USA), a dry, leafing aluminum flake powder.

Example 2

Comparative

Commercial product Benda-Lutz® 7080 (Sun Chemical, Corp.), a dry, nonleafing aluminum flake powder.

Example 3

125 g Aromatic 100 (a petroleum distillate) was weighed into a beaker, stirred and heated on a hot plate to 100° C. 50 g Crylcoat 2441-2 thermosetting resin (Allnex, Brussels, Belgium) was dissolved in the aromatic 100 to make a resin solution. In the meantime, ~307 g Benda Lutz® Leafing 1081 paste (65% aluminum flake, d50=9.0 μm. Sun Chemical Corp.) in mineral spirits was added to a dual arm mixer and heated to ~80° C. while stirring. The resin solution was added to the aluminum paste and stirred for 1 hour at 80° C. The resulting paste was pressed through a 3 mm screen and dried overnight under vacuum to make an aluminum pellet that was 80% aluminum flake pigment and 20% resin.

Example 4

The same procedure as Example 3, except that 10.5 g of Polymac 5650 thermosetting resin (Polynt Composites, USA, Inc., Carpentersville, USA) in 26.2 g aromatic 100 was used for the resin solution. The resulting pellet was 95% aluminum flake pigment and 5% resin.

Example 5

The same procedure as Example 3 except that 87.5 g of Polymac 5650 (Polynt Composites, USA, Inc., Carpentersville, USA) in 214 g aromatic 100 was used for the resin solution. The resulting pellet was 70% aluminum flake pigment and 30% resin.

Example 6

250 g aromatic 100 is weighed into a beaker, stirred and heated on a hot plate to 100° C. 100 g IVC Clear TGIC 86146T90K-A (IVC Industrial Coatings, Brazil, USA) was dissolved in the aromatic 100 to make a resin solution. In the meantime, ~615 g Benda. Lutz® Leafing 1081 paste (65% aluminum flake, Sun Chemical Corp.) in mineral spirits was added to a dual arm mixer and heated to ~80° C. while stirring. The resin solution was added to the aluminum paste and stirred for 1 hour at 80° C. The resulting paste was pressed through a 3 mm screen and dried overnight under vacuum to make an aluminum pellet that was 80% aluminum flake pigment and 20% of a finished powder coating.

Example 7

The same procedure as Example 6 except that 10.5 g Low Gloss Anodized Hybrid Base (thermosetting polyurethane/epoxy) 89065H50K-DEV (PPG, Pittsburgh, USA) in 26.2 g aromatic 100 was used for the resin solution. The resulting pellet was 95% aluminum flake pigment and 5% of a finished powder coating.

Example 8

The same procedure as Example 6 except that a non-leafing aluminum paste with d50=9 μm was used. The resulting pellet was 80% aluminum flake pigment and 20% of a finished powder coating.

Example 9

Dry Blending

The finished powder coating containing Example 6 was compared to the finished powder coating containing Comparative Example 1.

2000 g of a finished powder coating resin was combined with a specified amount of the pellet of Example 6. The lid was closed and the sample was mixed at 2200 RPM for five minutes. The blended powder was passed through a 100 mesh sieve to give the finished powder coating composition, 6.

Example 1 was added at 1% to a Henschel mixer with the remainder being the High Gloss TGIC polyester. The samples were mixed at 2200 RPM until the softening point of the resin was reached. Once this occurred the samples were discharged. The bonded powder was passed through a 100 mesh sieve to give the finished powder coating composition, 1A.

The pigments were compared to the bonded coating of Example 1. The pigmented powder coatings were then sprayed onto a steel panel and cured at 200° C. for 15 minutes to form Example 1A and 6A. The formulations of the finished powder coatings are reported in Table 1.

sieve to give the finished powder coating. The pigmented powder coatings were then sprayed onto a steel panel and cured at 200° C. for 15 minutes. The formulations of the finished powder coatings are reported in Table 2.

To characterize the panels, the gloss was measured via a Rhopoint IQ goniophotometer and reported as an average of five measurements. The brightness (L*) was measured using a Datacolor SF600 plus spectrophotometer using a diffuse reflection sphere.

TABLE 1

| Sample ID | Type of Finished Powder Coating* | Amount of Unpigmented Powder Coating % | Amount of pigment in final powder coating (%) | Gloss | L* |
|---|---|---|---|---|---|
| Comp. Ex. 1A (bonded) | High Gloss TGIC Polyester | 99.0% | 1.0% | 219.8 | 75.1 |
| Ex. 6A (blended) | High Gloss TGIC Polyester | 99.0% | 1.0% | 360.4 | 83.3 |

High Gloss TGIC Polyester = IVC Clear TGIC 86146T90K-A (IVC Industrial Coatings, Brazil, USA)
β-hydroxyalkylamide Polyester = EZ035D (Akzo Nobel, Amsterdam, Netherlands)
Low Gloss TGIC Polyester = SD 70 Clear, (TCI Powder coatings, Ellaville, USA)
Polyurethane Epoxy-Polyester Hybrid = Low Gloss Anodized Hybrid Base 89065H50K-DEV (PPG, Pittsburgh, USA).

Table 1 shows that the dry blended effect pigment preparation of Example 6 has a gloss and L* that is improved with respect to the bonded effect pigment preparation of Comparative Example 1.

Example 10

Grinding 1000 g of a finished powder coating was added to a twin-screw extruder with an 86/36/33° C. (Zone 1/2/3) heating/cooling profile. The feed rate was set at 50 Amp. The extruded ribbon was broken into one- to two-inch pieces and added to an osterizer along with a specified amount of one of the pellets of Examples 3-9, 11, and 13. The samples were impact milled for 20 seconds and sieved through a 100 mesh

TABLE 2

| Sample ID | Type of Finished Powder Coating* | Amount of Unpigmented Powder Coating % | Amount of pigment in final powder coating (%) | Gloss | L* |
|---|---|---|---|---|---|
| Comp. Ex. 1 | High Gloss TGIC Polyester | 99.0% | 1.0% | 219.8 | 75.1 |
| Comp. Ex. 2 | Low Gloss TGIC Polyester | 94.0% | 2.5% | 58.8 | 78.62 |
| Ex. 3 | High Gloss TGIC Polyester | 99.0% | 1.0% | 256.2 | 59.5 |
| Ex. 4 | β-hydroxyalkylamide Polyester | 99.0% | 1.0% | 269.5 | 80.7 |
| Ex. 5 | Low Gloss TGIC Polyester | 99.0% | 1.0% | 10.2 | 64.6 |
| Ex. 6 | Polyurethane | 99.0% | 1.0% | 122.4 | 78.7 |
| Ex. 7 | Epoxy-Polyester Hybrid | 99.0% | 1.0% | 133.1 | 74.5 |
| Ex. 8 | Low Gloss TGIC Polyester | 94.0% | 4.0% | 95.7 | 73.4 |

High Gloss TGIC Polyester = IVC Clear TGIC 86146T90K-A (IVC Industrial Coatings, Brazil, USA)
β-hydroxyalkylamide Polyester = EZ035D (Akzo Nobel, Amsterdam, Netherlands)
Low Gloss TGIC Polyester = SD 10 Clear, (TCI Powder coatings, Ellaville, USA)
Polyurethane Epoxy-Polyester Hybrid = Low Gloss Anodized Hybrid Base 89065H50K-DEV (PPG, Pittsburgh, USA).

Table 2 shows that the pigment pellet preparation, which can be made into powder coating compositions using various resin types and amounts of pigments, produce powder coatings that exhibit good gloss and brightness characteristics. The pigment pellet preparation that was ground into the powder coating has a similar gloss and color as the pigment pellet preparation that was bonded.

Those skilled in the art having the benefit of the teachings of the disclosure as hereinabove set forth, can effect numerous modifications thereto. These modifications are to be construed as being encompassed with the scope of the disclosure as set forth in the appended claims.

What is claimed is:

1. A pigment pellet preparation comprising an effect pigment material dispersed in a thermosetting resin material, wherein the effect pigment material comprises one or more effect pigment and the thermosetting resin material comprises one or more thermosetting resin,
    wherein the one or more thermosetting resin has 3 or more reactive terminal groups and the thermosetting resin material has an acid number from about 10 to about 50 mg KOH/g resin,
    wherein the preparation comprises from about 70% to about 90% by weight of the one or more effect pigment,
    wherein the preparation comprises from about 5% to about 30% by weight of the one or more thermosetting resin,
    wherein the preparation comprises the effect pigment material and thermosetting resin material in a combined amount of about 95% or more by weight, and
    wherein the pellets have a diameter of about 0.5 mm to about 5 mm and a length of about 1 mm to about 5 cm.

2. The preparation of claim 1, wherein the thermosetting resin material has a $T_g$ of about 55° C. or higher.

3. The preparation of claim 1, wherein the thermosetting resin material comprises at least one oligomer selected from polyesters, epoxies, acrylics, polyurethane, polyester/epoxy hybrids, and combinations thereof.

4. The preparation of claim 1, wherein the pigment pellet preparation is friable.

5. The preparation of claim 1, wherein the effect pigment material is selected from metallic pigments, pearlescent pigments, and combinations thereof.

6. The preparation of claim 5, wherein the pearlescent pigment comprises at least one transparent, non-metallic, platelet-shaped substrate that is at least partially coated with one or more layers comprising a metal oxide having refractive indices.

7. The preparation of claim 6, wherein the pearlescent pigment comprises a layer selected from the group of silicon dioxide, titanium dioxide, zinc oxide, zirconium dioxide, tin oxide, cerium dioxide, vanadium (IV) oxide, manganese oxide, lead oxide, chromium oxide, iron oxide, aluminum oxide, tungsten oxide, hydrated oxides of any one of the aforementioned oxides, doped oxides of any one of the aforementioned oxides, and mixtures and alloys thereof.

8. The preparation of claim 5, wherein the metallic pigment is selected from aluminum, zinc, copper, zinc-copper alloy, magnesium, chromium, silver, iron, gold, platinum, copper-silver alloy, silver coated copper, copper coated silver, silver coated aluminum, and mixtures and alloys thereof.

9. The preparation of claim 8, wherein the metallic pigment further comprises a lubricant selected from saturated or unsaturated fatty acids, fatty amines, fatty-alcohols, fatty thiols, and combinations thereof.

10. The preparation of claim 8, wherein the metallic pigment comprises a coating of metal oxide selected from silicon dioxide, titanium dioxide, zinc oxide, zirconium dioxide, tin oxide, cerium dioxide, vanadium (IV) oxide, manganese oxide, lead oxide, chromium oxide, iron oxide, aluminum oxide, tungsten oxide, hydrated oxides of any one of the aforementioned oxides, and combinations thereof.

11. The preparation of claim 1, wherein the effect pigment material is at least partially coated with a bonding agent that comprises at least two reactive groups.

12. The preparation of claim 11, wherein the bonding agent comprises at least one of acrylic acid, phosphate ester, and silane.

13. The preparation of claim 1, further comprising one or more additives.

14. A method for making the pigment pellet preparation of claim 1 comprising forming a paste by mixing the effect pigment material with the thermosetting resin material at a temperature of about 100° C. or higher and pressing the resulting paste through a screen to form pellets.

15. A powder coating composition comprising the preparation of claim 1 and one or more crosslinker.

16. The powder coating of claim 15, additionally comprising one or more flow agent, degassing agent, light stabilizer, anti-oxidants, dispersant, charge control agents, antistatic, anti-caking additive, mar-resistance additive, texturizing additive, gloss control additive, catalyst, pigment, filler, and combinations thereof.

17. A method for making a powder coating comprising the steps of:
    a) extruding a mixture of a crosslinker and resin to produce an extruded ribbon,
    b) grinding the extruded ribbon, and
    c) bond or dryblend,
    wherein the pigment pellet preparation of claim 1 is added at step b), c), or both.

18. The method of claim 17, wherein the mixture of step a) further comprises one or more additive selected from crosslinking agents, flow control additives, antioxidants, degassing additives, light stabilizers, UV absorbers, dispersants, lubricants, charge control additives, anti-caking additives, mar resistance additives, texturizing additives, gloss control additives, catalysts, tougheners, antibacterial additives, adhesion promoters, sealants, anti-condensation additives, IR reflectors, organic pigments, inorganic pigments, tillers, and combinations thereof.

19. A method for making a powder coating composition comprising mixing the pigment pellet preparation of claim 1 with a crosslinker and resin, wherein the mixing step is selected from extrusion, grinding, dry blending, bonding, and combinations thereof.

* * * * *